(12) United States Patent
Hines

(10) Patent No.: US 7,375,621 B1
(45) Date of Patent: May 20, 2008

(54) VEHICLE PARKING APPARATUS

(76) Inventor: Stephen P. Hines, 1540 Wabasso Way, Glendale, CA (US) 91208

( * ) Notice: Subject to any disclaimer, the term of this patent is extended or adjusted under 35 U.S.C. 154(b) by 0 days.

(21) Appl. No.: 11/810,236

(22) Filed: Jun. 5, 2007

(51) Int. Cl.
*B60Q 1/00* (2006.01)
(52) U.S. Cl. .................. 340/435; 340/932.2; 359/436
(58) Field of Classification Search ............. 340/435, 340/903, 932.2, 937, 436, 438, 463; 348/118, 348/136, 137; 359/436, 443
See application file for complete search history.

(56) References Cited

U.S. PATENT DOCUMENTS

| | | | |
|---|---|---|---|
| 2,316,751 A | 4/1943 | Adler, Jr. ................... 88/1 |
| 4,214,266 A * | 7/1980 | Myers ..................... 348/140 |
| 5,343,295 A | 8/1994 | Lara et al. ............... 356/399 |
| 5,406,395 A | 4/1995 | Wilson et al. ............ 359/15 |
| 5,598,972 A | 2/1997 | Klein, II et al. ......... 239/1 |
| 5,754,099 A * | 5/1998 | Nishimura et al. ........ 340/435 |
| 6,040,787 A | 3/2000 | Durham ................... 340/932.2 |
| 6,204,754 B1 | 3/2001 | Berstis ..................... 340/435 |
| 6,411,867 B1 * | 6/2002 | Sakiyama et al. ......... 701/1 |
| 6,429,420 B1 | 8/2002 | Babst et al. .............. 250/221 |
| 6,483,441 B1 | 11/2002 | Hinde ...................... 340/932.2 |
| 6,693,524 B1 * | 2/2004 | Payne ...................... 340/463 |
| 7,049,978 B2 | 5/2006 | Li ........................... 340/932 |
| 2005/0073397 A1* | 4/2005 | Zheng et al. .............. 340/435 |
| 2006/0267745 A1 | 11/2006 | Larson ..................... 340/431 |

* cited by examiner

*Primary Examiner*—Phung T Nguyen
(74) *Attorney, Agent, or Firm*—Wagner Anderson & Bright, L.L.P.; Roy L. Anderson

(57) ABSTRACT

A distance indicating apparatus and method determine the distance between a fixed object and a moving object (such as a motor vehicle, airplane or water vessel) by using two spaced-apart projectors to project a distance indicating scale (which can include non-linear markings) and an index along two different paths onto a projection target surface where they are visible to create a visual distance indication that varies as the fixed and moving objects vary in distance less than a certain distance.

20 Claims, 10 Drawing Sheets

SECOND IMAGE

FIRST IMAGE

Film image for second projector (on car's right rear).

Film image for first projector (on car's left rear).

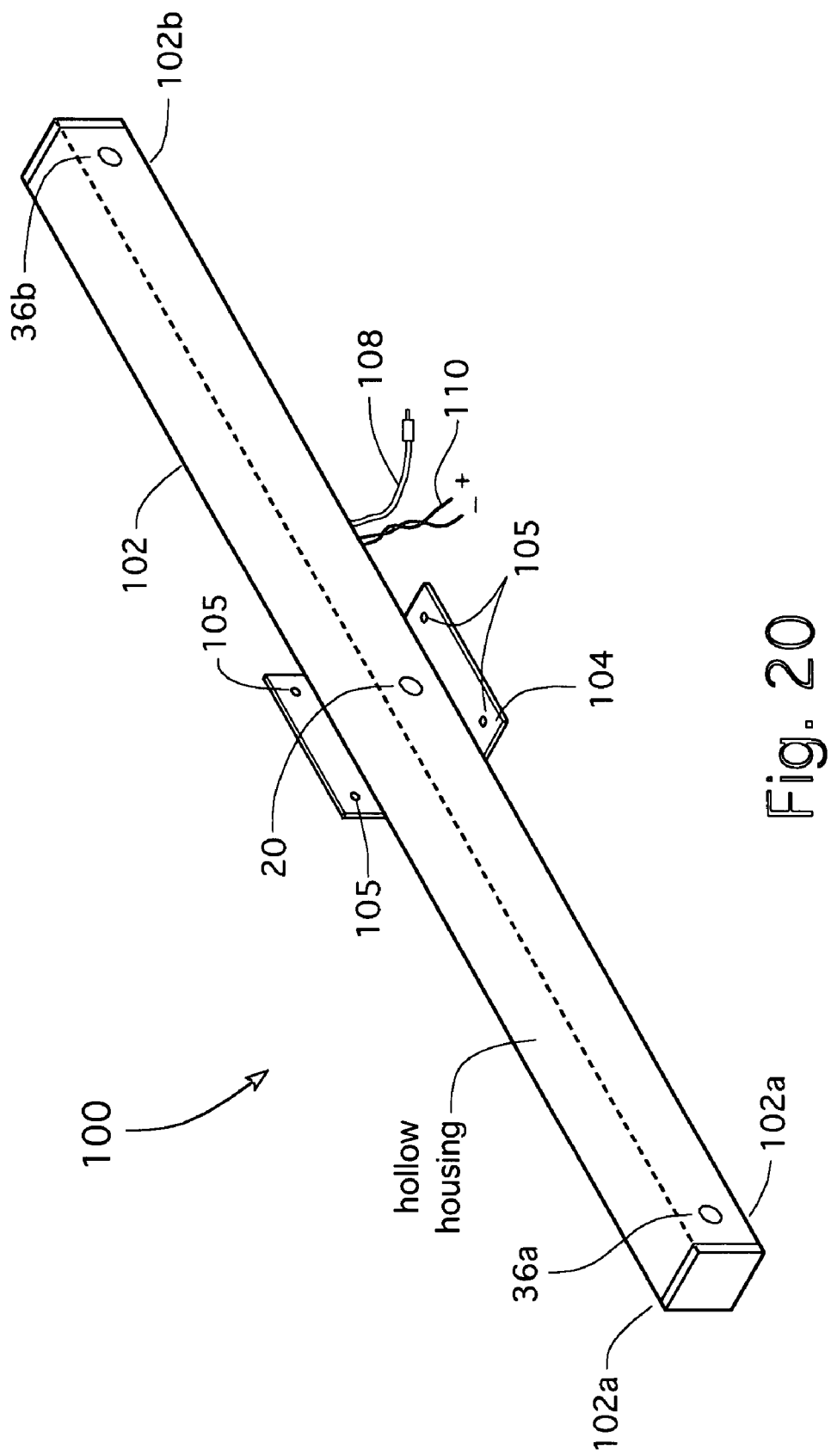

VEHICLE PARKING APPARATUS

FIELD OF THE INVENTION

The present invention relates generally to vehicle parking systems. More particularly, the invention concerns a distance-measuring vehicle parking system.

BACKGROUND OF THE INVENTION

Problems involved with evaluating the distance between the rear of a vehicle and rearwardly positioned structures during vehicle back up and parking have long been recognized. Failure to correctly gauge the distance between the rear of the vehicle and a stationary rear wall can result in substantial damage to both the vehicle and to the rear wall. A number of both high-tech and low-tech devices have been suggested in the past to alleviate these problems. By way of example a number of vehicle back up systems involve the use of various kinds of mechanical devices that are mounted on the rear of the vehicle. These types of devices often include numerous interrelated components and are typically subject to mechanical breakdown. Other more sophisticated systems involve the use of video cameras, image sensors and laser devices. These latter types of systems are often quite complex and typically quite expensive.

SUMMARY OF THE INVENTION

The present invention is generally directed to a distance indicating apparatus and method for determining the distance between a fixed object and a moving object in which two spaced-apart projectors project a distance indicating scale and an index along two different paths onto a projection target surface where they are visible to create a visual distance indication that varies as the fixed and moving objects vary in distance less than a certain distance.

In a first, separate group of aspects of the present invention, the distance indicating scale (which can be varied) includes non-linear markings indicative of distance and the projection target surface can be located on the fixed object or on the moving object (which may be a motor vehicle, airplane or water vessel). In one embodiment the projection target surface can be used in a trucking loading bay and it can be located on the back of the truck and viewable by use of one or more mirrors.

In a second, separate group of aspects of the present invention, the projectors are mounted on the moving object and a rearview camera is also mounted on the moving object for viewing the fixed object. The projectors can be made from a light source, a film image and a lens disposed intermediate the light source and the film image or they can use a laser and a holographic film recorded with an image or use a generally cylindrically shaped lens.

Accordingly, it is a primary object of the present invention to provide an improved apparatus and method for a simple, easy-to-use and highly reliable vehicle parking system that permits continuous monitoring by the operator of the vehicle of the decreasing distance between the vehicle and a stationary structure.

This and further objects and advantages will be apparent to those skilled in the art in connection with the drawings and the detailed description of the preferred embodiment set forth below.

BRIEF DESCRIPTION OF THE DRAWINGS

FIG. 20 is a generally perspective view showing an embodiment of the apparatus of the invention, here illustrated as an aftermarket parking apparatus.

DESCRIPTION OF THE INVENTION

Figure 1:
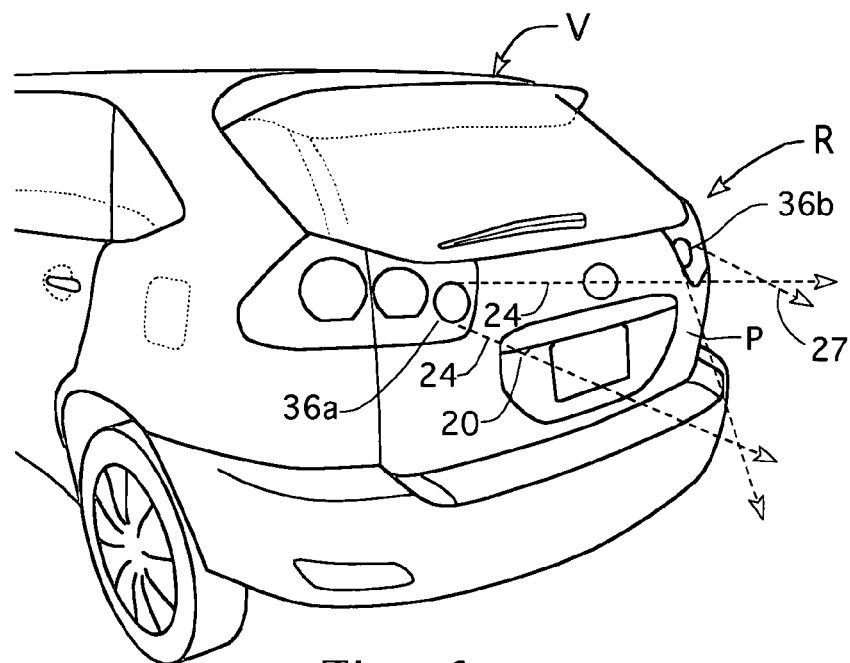
FIG. 1 is a generally perspective, fragmentary view of the rear portion of the conventional vehicle illustrating the positioning of the various components that make up one form of the vehicle parking system of the present invention.

Preferred embodiments of the present invention provide an apparatus and method for allowing drivers of vehicles to visually determine the distance of their vehicle from a fixed location. The present invention is especially useful when an operator is backing up a vehicle, although it is also useful in vehicles that are large in size (such as airplanes or water vessels) and where the operator is distant from the point being approached.

In accordance with the present invention, two images are projected onto a projection target surface and the relationship of these images one to another varies as the moving object varies in distance relative to the fixed object (assuming they are close enough for use of the present invention). Because there is a scale on the projection target, a driver can use the scale to adjust his or her stopping point. This is especially beneficial when the desired stopping point may vary. For example, while one might want to back up as close to a wall of a garage as possible under ordinary circumstances, this will not be the case when there is a reason not to do so such as when there may be something on the floor of the garage that the driver does not want to hit or if there may be something that partially blocks the path of a vehicle, such as one might find, for instance, in a loading bay. Alternatively, there may be something on the back of the vehicle that the driver does not want to hit garage wall—for example, the vehicle may have a bike rack or some other device that extends outwardly from the normal back of the vehicle. This is especially true if the vehicle is a device such as a recreational vehicle that is towing another object or has a storage device affixed to its rear surface.

The invention will now be described in reference to the preferred embodiments depicted in the drawings.

Figure 2:
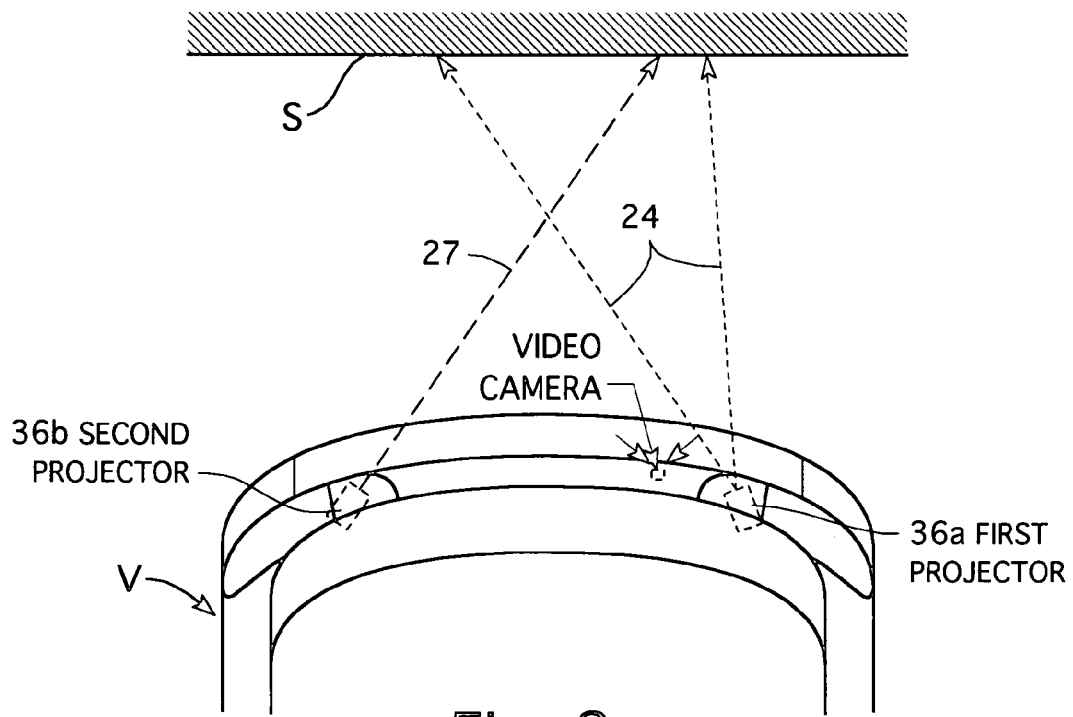
FIG. 2 is a top plan view of the rear portion of the conventional vehicle shown in FIG. 1, further illustrating the positioning of the various components that make up one form of the vehicle parking system of the present invention.

FIGS. 1 and 2 illustrate a preferred embodiment of the present invention useful in vehicle parking and especially useful in backing up a vehicle, such as a passenger car, toward a fixed object, such as a garage door, or other structure. The apparatus shown in FIGS. 1 and 2, which is adapted to be used in connection with a vehicle "V" having a rear portion "R", including a rear panel "P", comprises a rearview video camera 20 mounted on the rear panel "P" of the vehicle for viewing the area located rearwardly of the vehicle and first and second spaced-apart projectors 36a and 36b mounted on the rear portion of the vehicle for projecting first and second images onto a surface "S" disposed rearwardly of the vehicle (FIG. 2).

Figure 6:
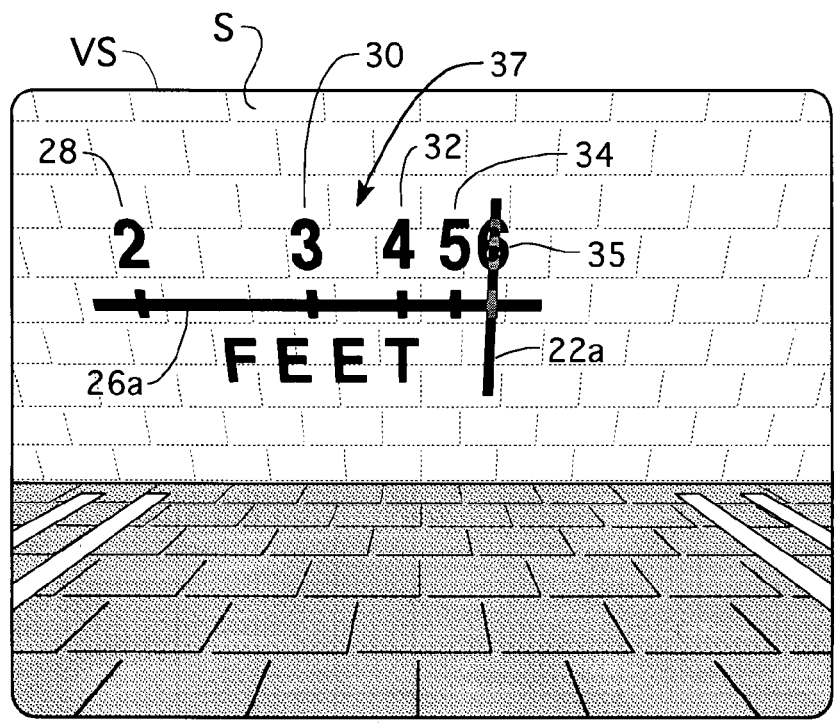
FIG. 6 is a generally illustrative view showing the images of FIGS. 4 and 5 that have been projected on a rearwardly positioned structure by projectors.
Figure 7:
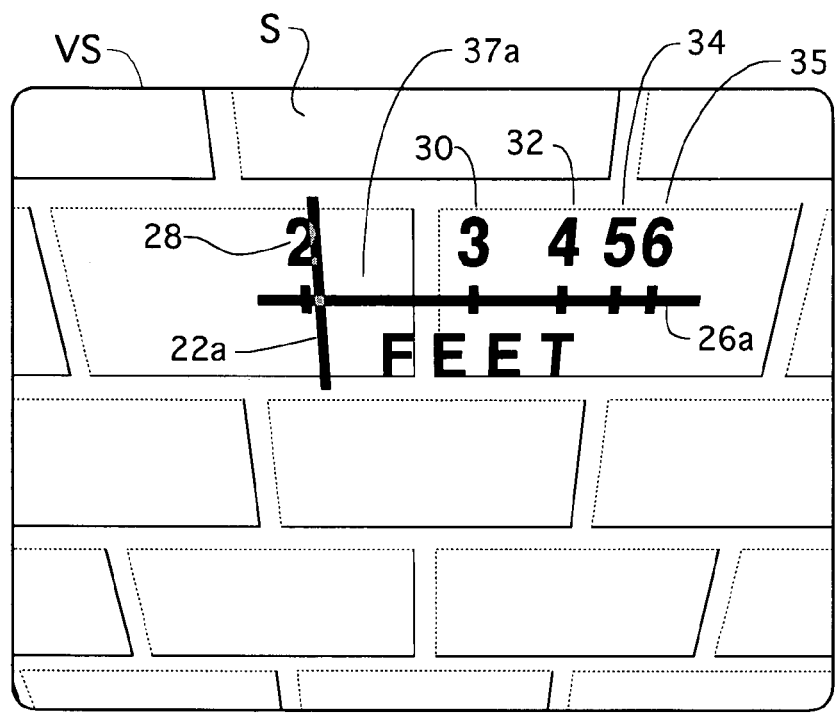
FIG. 7 is a generally illustrative view similar to FIG. 6 illustrating the manner in which the projected lines slide over each other as the vehicle moves toward the rearwardly positioned structure.
Figure 8:
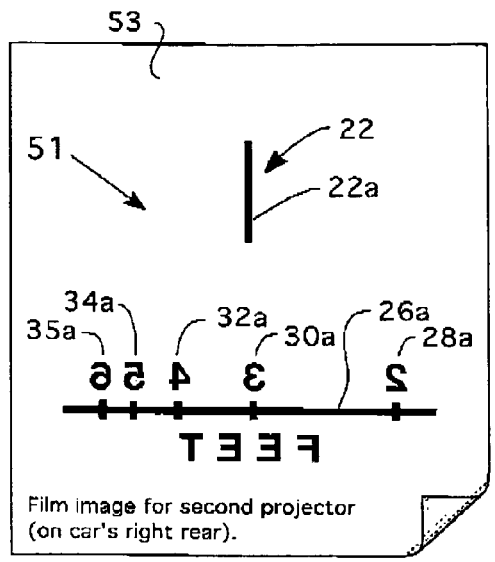
FIG. 8 is a generally illustrative view showing a film image that can be used with a projector on the right rear of a vehicle to project images onto a projection target surface.
Figure 9:
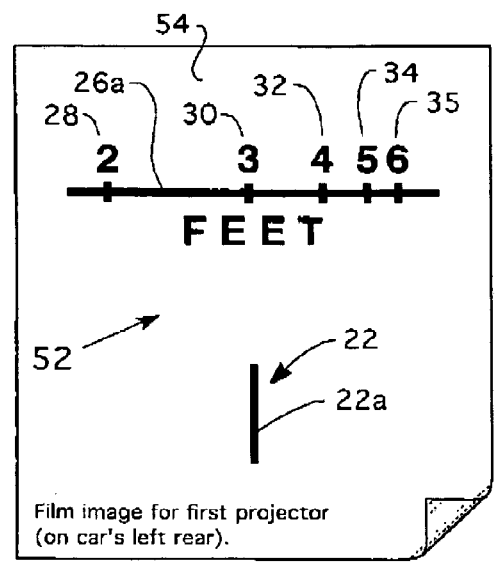
FIG. 9 is a generally illustrative view showing a film image that can be used with a projector on the left rear of a vehicle to project images onto a projection target surface.
Figure 10:
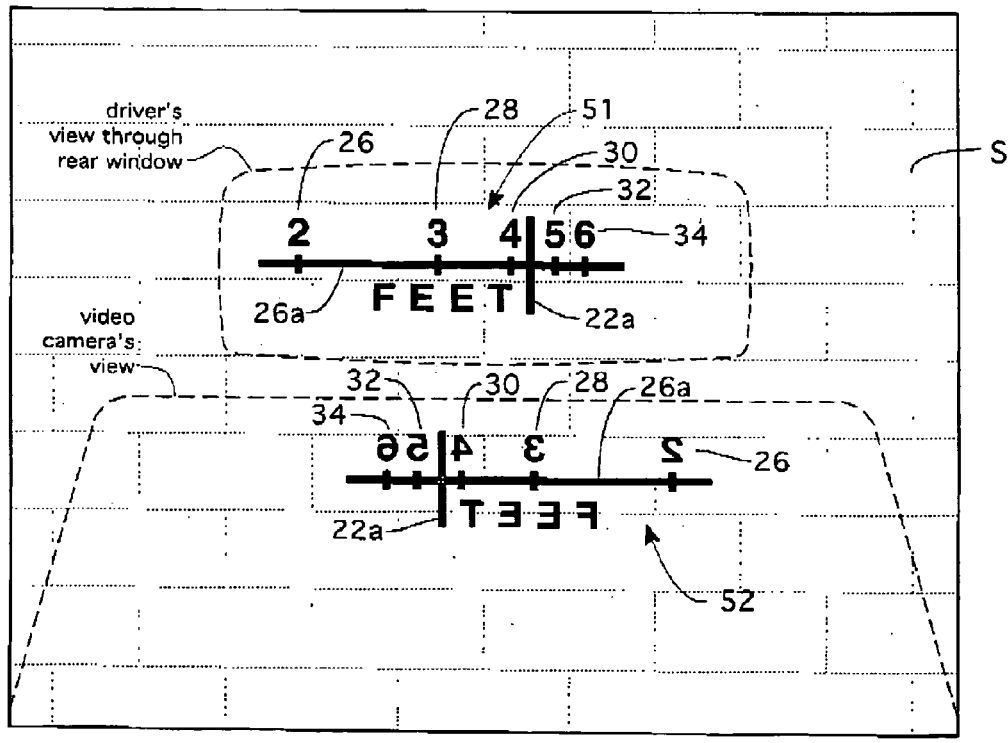
FIG. 10 is a generally illustrative view showing the images of FIGS. 8 and 9 that have been projected on a rearwardly positioned structure as they appear to a driver when viewed through the rear window (upper portion of FIG. 10) and as they appear to a video camera (lower portion of FIG. 10).

In a first embodiment of the invention, which is illustrated in FIGS. 1, 2, 4 and 5, a first projector 36a projects a first image 26 (FIG. 5) along a first path 24 (FIG. 2). The second projector 36b projects second image 22 (FIG. 4) along a second path 27 (FIG. 2). More particularly, first image 26 is a generally horizontally extending first-line 26A while second image 22 is a generally vertically extending second line 22A and a plurality of spaced-apart distance indicating indices, here distance indicating numbers 28, 30, 32, 34 and 35. The first-line 26A functions as an index while second line 22A and the spaced-apart distance indicating indices function as a distance indicating scale. As indicated in FIG. 6, when vehicle "V" is in the position indicated in FIG. 2 of the drawings, lines 22a and 26a are projected onto surface "S" by the projector in the crossing relationship of the image 37 shown in FIG. 6. However, as indicated in FIG. 7, as the vehicle "V" backs up and moves closer toward surface "S", lines 22a and 26a slide horizontally over each other to produce image 37a wherein the point of the intersection of the two lines indicates the distance to the surface "S". Due to the construction and positioning of video camera 20, lines 22a and 26a are readily visible to the vehicle operator by looking at a video screen mounted within the operator compartment and operably interconnected with the video camera in a manner well understood by those skilled in the art. Video camera 20 preferably has a 110 to 120 degree field of view and is preferably interconnected with the vehicle circuitry so that the video camera is energized automatically when the vehicle is placed in a reverse gear.

While various types of video cameras suitable for use in the apparatus of the invention are readily commercially available, a video system sold by Sony Corporation of Tokyo, Japan is especially well-suited for the present application. Similarly, the components necessary to construct suitable types of projectors are readily commercially available and can readily be assembled by those skilled in the art. By way of example, projectors suitable for use in connection with the invention include projector units 36 of the character illustrated in FIG. 11. As indicated in this drawing, the projector unit includes a light source 38, a field lens 39 that is disposed intermediate the light source and an image carrying film 40 and a projection lens 44. In a manner well understood by those skilled in the art, the projector unit is packaged so that it can be conveniently mounted in the rear panel "P" of the vehicle. In a first embodiment of the invention film 40b within first projector unit 36a (FIG. 14) comprises an image of the substantially horizontal line 26a as well as an image of distance indicating numbers 28, 30, 32, 34 and 35. Similarly, in the first embodiment film 40a within the second projector unit 36b (FIG. 11) comprises an image of the substantially vertical line 22a.

As illustrated in FIG. 6, first and second projector units 36a and 36b can project an image 37 when they are provided with a suitable film, such as that shown in FIG. 6, which comprises a generally horizontal line 26a and a plurality of spaced-apart distance indicating numbers disclosed proximate the horizontal line and a generally vertical line 22a that intersects horizontal line 26a. Preferably, projector units 36a and 36b are interconnected with the vehicle circuitry in a manner so that the units will be energized at the time the vehicle is moved into a reverse gear.

As shown in FIGS. 5-9, the horizontal position of the distance indicating numbers 28, 30, 32, 34 and 35 is non linear horizontally so that the marks project accurately as the vehicle moves longitudinally closer to the wall. The non linearity comes from the geometrical or perspective fore shortening that the first projector 36a "sees" of surface S as the vehicle is backed a uniform distance toward the surface, from 6 ft., to 5 ft., to 4 ft., to 3 ft., to 2 ft. (all, measured from the rear bumper). This scaling is especially important for the operator of the vehicle so that the operator has a simple mechanism for evaluating the fore shortening so that the operator is not misled, even if the operator is aware of the fore shortening.

FIGS. 3, 8, 9 and 10 illustrate another form of image produced by still another form of the apparatus of the invention. The apparatus of this alternate form of the invention is similar in many respects to that previously described and is adapted to be used in connection with a vehicle "V" having a rear portion "R", including a rear panel "P".

Figure 3:
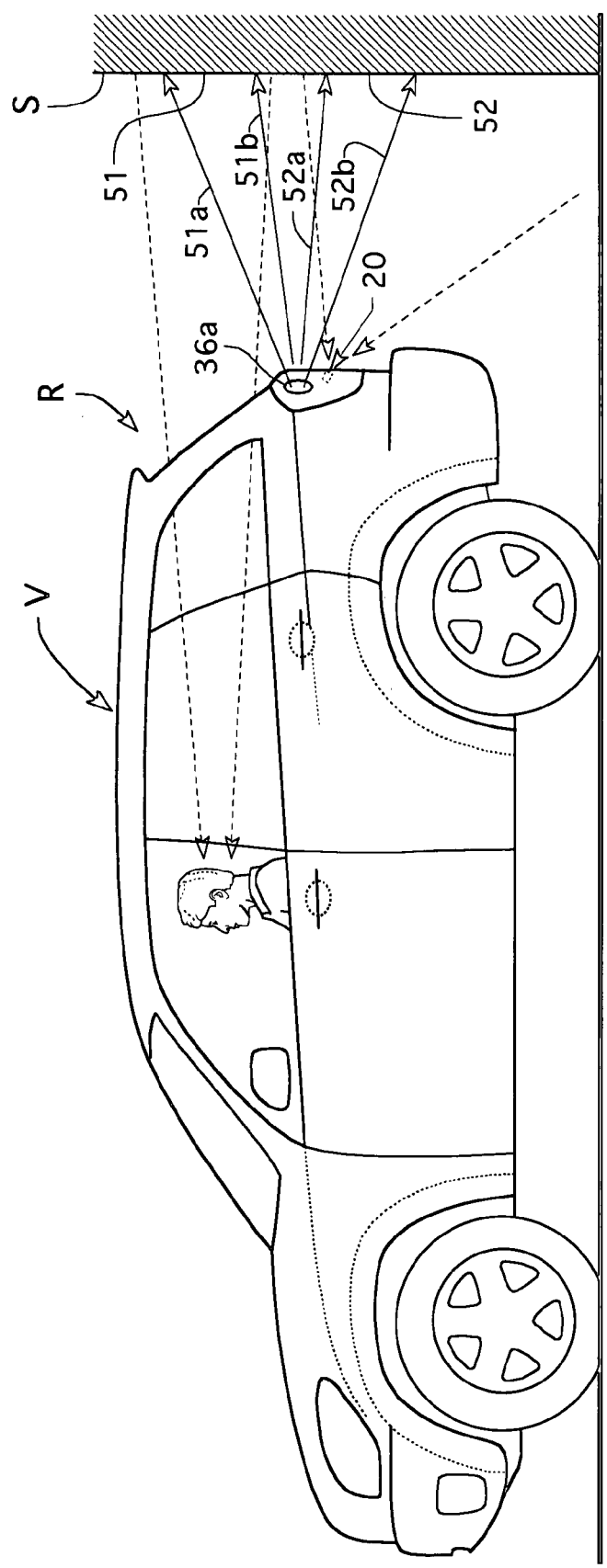
FIG. 3 is a side view of the conventional vehicle shown in FIG. 1, illustrating an alternate operation of the various components that make up an alternate form of vehicle parking system of the present invention.
Figure 4:
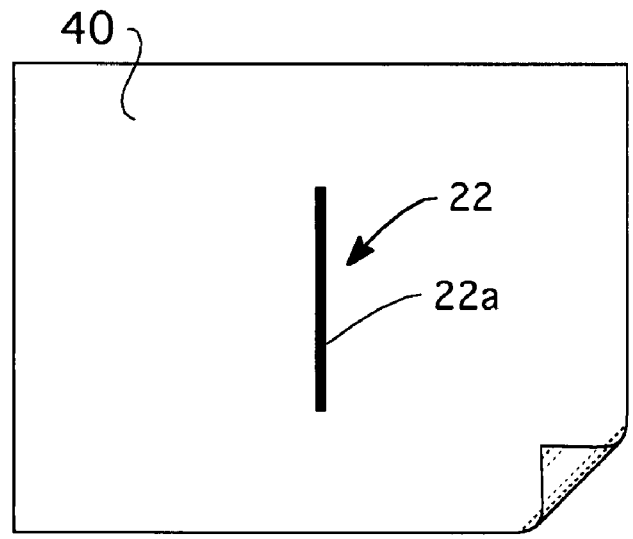
FIG. 4 is a generally illustrative view showing a film image that can be used with a projector to project a distance indicator onto a projection target surface.

However, FIGS. 3, 8, 9 and 10 of the drawings illustrate a unique, bi-level approach wherein mutually exclusive fifth and sixth images 51 and 52 formed on films 53 and 54 (see FIGS. 8 and 9) are projected onto surface "S" along the different projection lines 51a, 51b, 52a and 52b, respectively, as shown in FIG. 3. More particularly, film image 51 is projected from second projector 36b that is located on the right rear of the vehicle, while film image 52 is projected from first projector 36a located on the left rear of the vehicle.

In using the apparatus of this alternative embodiment of the present invention, the top portions of projection image 51 and 52 can be seen by the driver by turning around and looking out the rear window. On the other hand, the bottom portion of projection image 51 and 52, which are reverse-reading and in which the projection lines and numbers are designated with the subscript "a", can be seen only by the video camera (see also FIG. 10 which illustrates the mutually exclusive right-reading top portion of images 51 and 52 in the driver's field of view, and the reverse-reading bottom portions of image 51 and 52 in the cameras filed of view).

Figure 12:
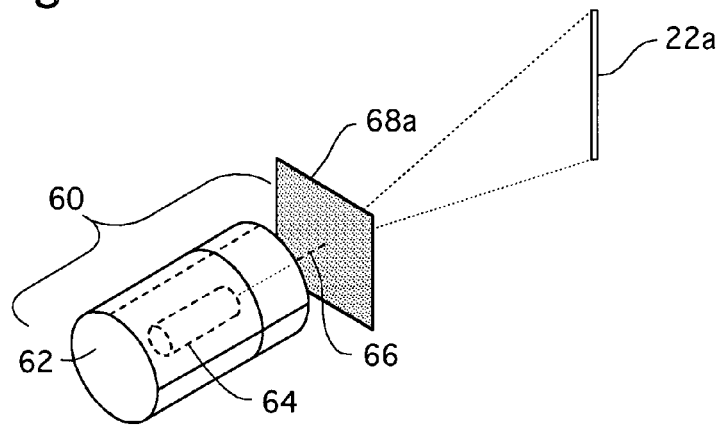
FIG. 12 is a generally perspective, illustrative view of another form of a second projector for projecting a second image onto a remotely positioned object.
Figure 15:
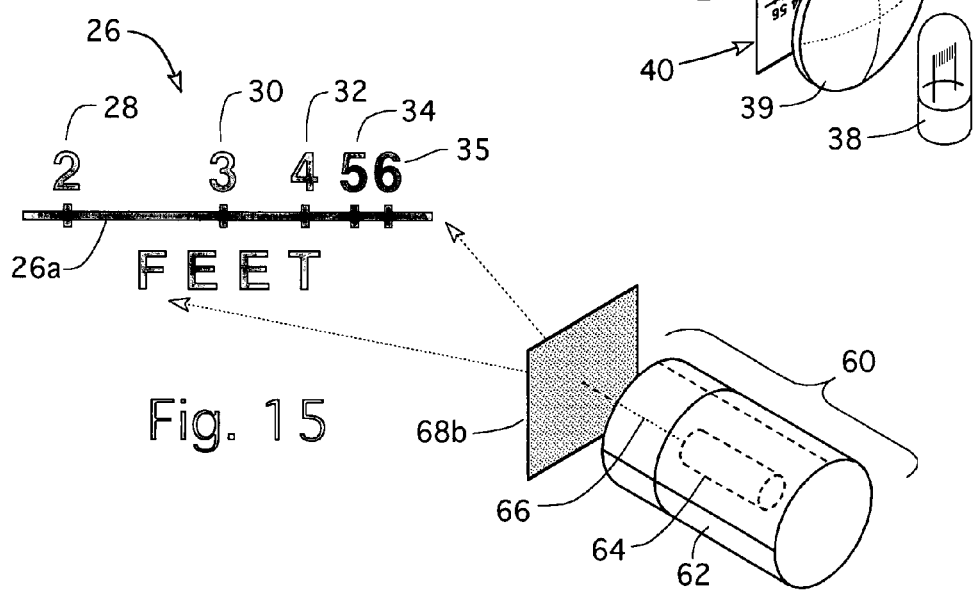
FIG. 15 is a generally perspective, illustrative view of an alternative first projector projecting a first image onto a remotely positioned object.

FIGS. 12 and 15 illustrate an alternate form of projector unit suitable for use in connection with the present invention generally designated by the numeral 60. Projector unit 60 is similar in some respects to projector unit 36 in that it includes a generally cylindrically shaped housing 62 that can be mounted in the rear panel "P" of the vehicle. However, projector unit 60 comprises a conventional, commercially available light source 64 that emits photons in a coherent beam 66. Such a source, typically referred to as a laser (Light Amplification by Stimulated Emission of Radiation), is readily commercially available from various sources including Coherent, Inc. of Santa Clara, Calif. Projector unit 60 further comprises holographic films 68a (FIG. 12) and 68b (FIG. 15). Holographic film 68a is recorded with a desired image such as image 22a illustrated in FIG. 12. Holographic film 68b, on the other hand is recorded with a desired image such as image 26 illustrated in FIG. 15. Suitable holographic are readily commercially available from Zebra Imaging located in Austin, Tex.

Figure 13:
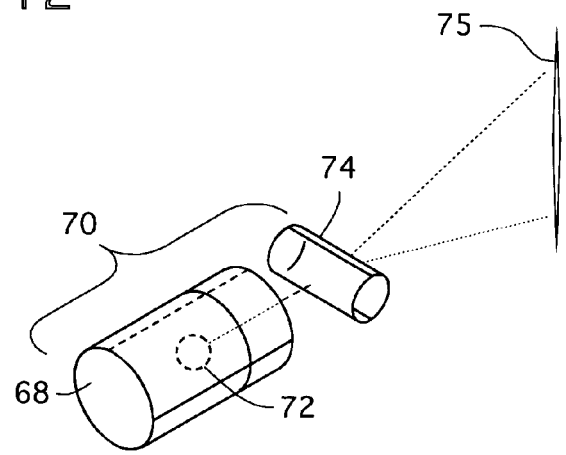
FIG. 13 is a generally perspective, illustrative view of yet another form of the second projector for projecting a second image onto a remotely positioned object.

Turning now to FIG. 13, still another form of projector unit suitable for use in the present invention is there illustrated and generally designated by the numeral 70. Projector unit 70 is also similar in some respects to projector unit 36 in that includes a generally cylindrically shaped housing 68 that can be mounted in the rear panel "P" of the vehicle. However, projector unit 70 comprises a light source 72 and a generally cylindrically shaped lens 74. As indicated in FIG. 13, the light from a light source 72 is transmitted through the side of the cylindrically shaped lens 74 which spreads the narrow beam of light emitted from the light source into a suitable line image, such as line 75.

Laser 64 and cylindrical lens 74 of the projector units of FIGS. 12 and 13 are readily commercially available from a number of commercial sources including Edmund Industrial Optics which is located in Barrington, N.J.

Figure 16:
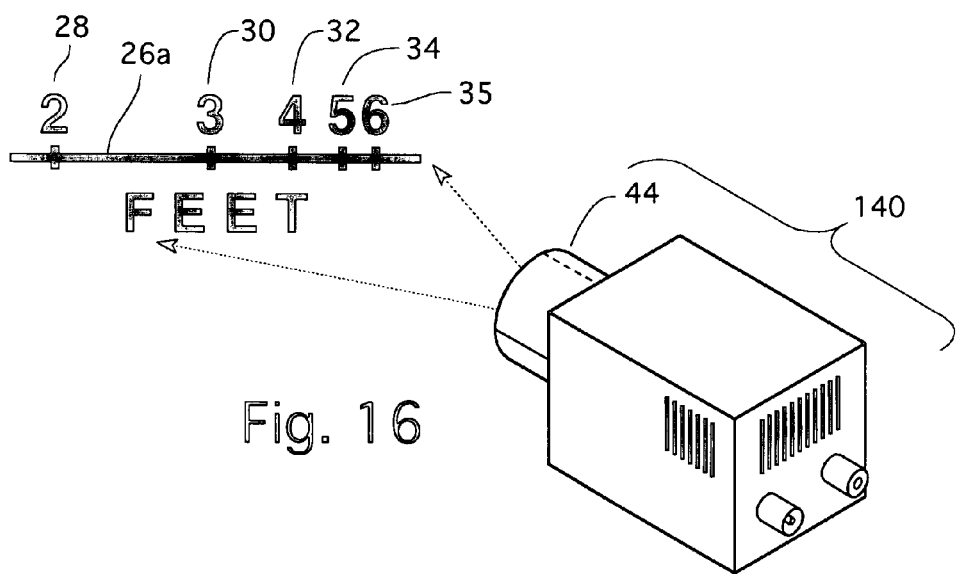
FIG. 16 is a generally perspective, illustrative view of another alternative first projector projecting a first image onto a remotely positioned object.

Yet another form of projector unit suitable for use in the present invention is illustrated in FIG. 16 in which electronically controlled projector 140 is used to project an image. The electronically controlled projector can be programmed to change the images it projects to select from multiple images or to recalculate the image to be projected based upon input to electronics in the projector. The mechanism for changing such programming can take any number of suitable forms such as are common today for programming electronic devices such as cell phones, PDAs, lap top computers, etc. An advantage of such a projector is that it might be used to change the image projected dependent upon changed circumstances or based upon operator selection for any number of reasons.

Figure 17:
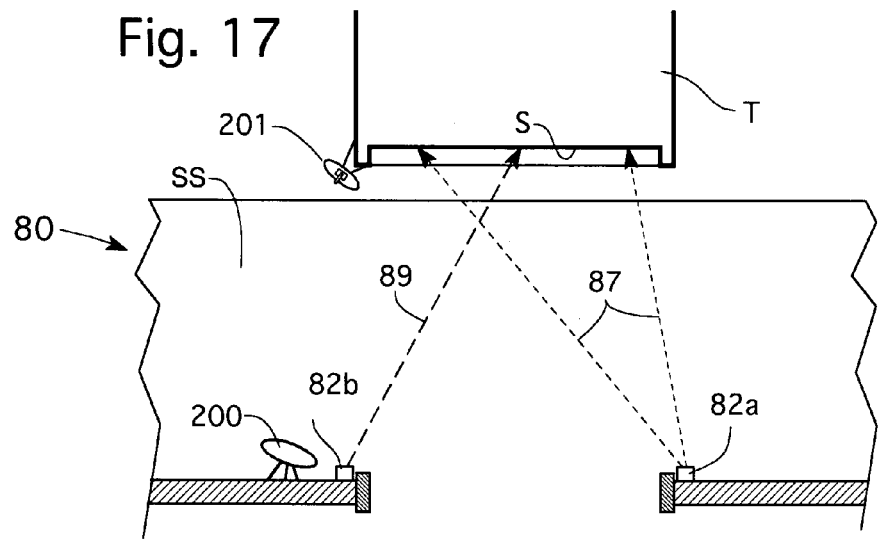
FIG. 17 is a generally diagrammatic, top plan view illustrating an alternate form of the apparatus of the invention, wherein the first and second projectors are mounted on a fixed object, such as a loading dock structure and are construed and arranged to project images onto a surface of a second object, such as a moving vehicle.
Figure 18:
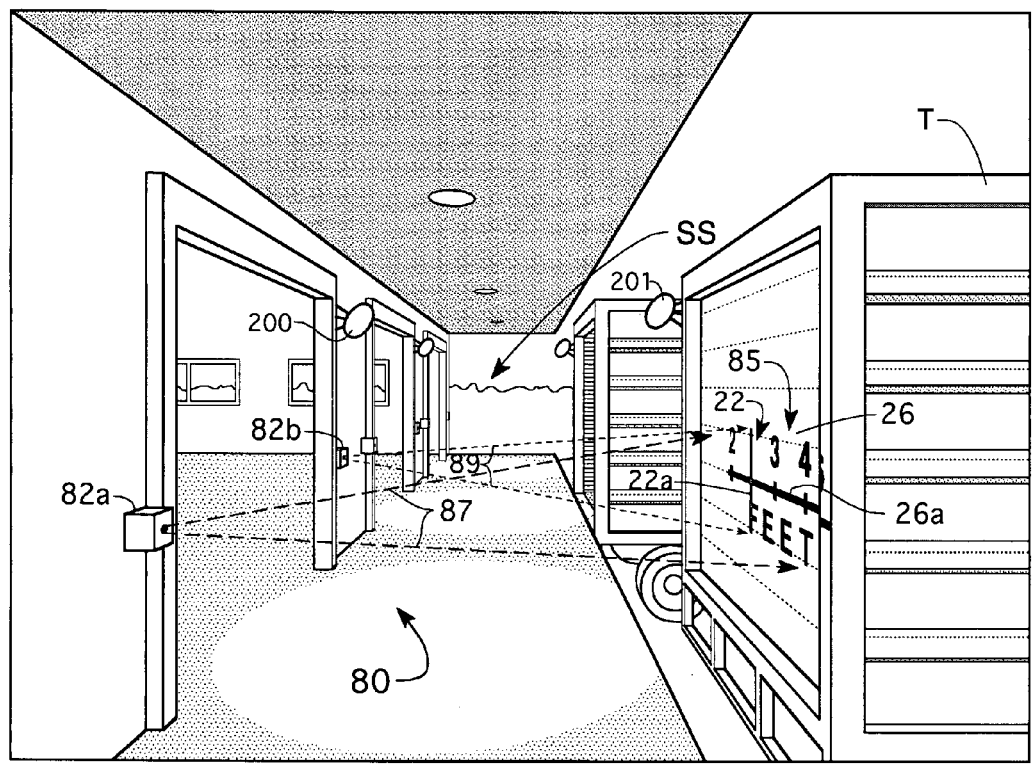
FIG. 18 is a generally perspective, illustrative view further illustrating the construction and operation of the alternate form of the apparatus in FIG. 16.

Turning next to FIGS. 17 and 18, an alternate form of the apparatus of the invention is there illustrated and generally designated by the numeral 80. The apparatus of this alternate form of the invention is somewhat similar to that previously described, but the projector units are here mounted on a stationary structure and are constructed and arranged to project selected images onto a surface of a moving object, such a truck "T". As in the earlier described embodiments of the invention, the devices which produce images of the character shown in FIGS. 4 and 5 of the drawings comprise first and second spaced-apart projectors. However, the projectors here comprise spaced-apart projector units 82a and 82b that are mounted on a stationary structure "SS", such as a loading dock, or the like. In this latest embodiment of the invention the projector units 82a and 82b are adapted to project images onto the surface "S" provided at the rear of the truck "T" (FIG. 18) which can be viewed by the driver of the truck by using a mirror 200 appropriately mounted at the stationary structure of by use of a mirror 201 mounted to the truck.

Figure 5:
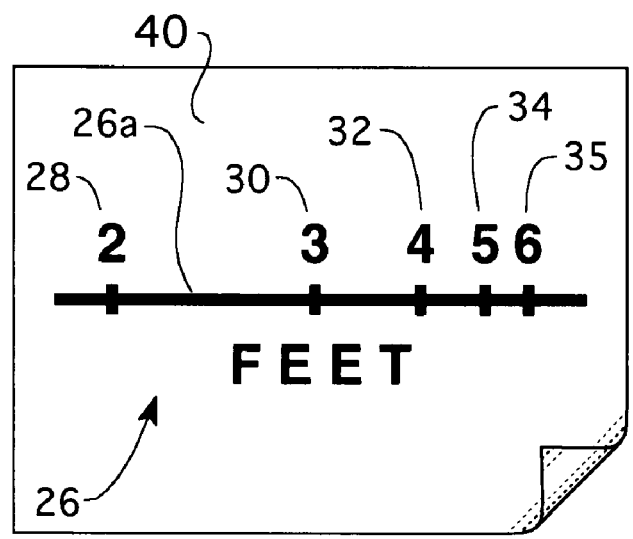
FIG. 5 is a generally illustrative view showing a second film image that can be used with a projector to project a distance indicating scale onto a projection target surface.

More particularly, the first projector unit 82a projects along a first path 87 an image 26, such is the image shown in FIG. 5 of the drawings. Similarly, the second projector unit 82b projects along a second path 89 an image 22, such as the image shown in FIG. 4 of the drawings. As before, first and second paths 87 and 89 cross so as to produce the image 85 illustrated in FIG. 18.

As indicated in FIG. 17, when the moving object, such as the vehicle or truck "T" is in position proximate the loading dock, the image 85 is projected onto surface "S" of the truck by the projector means. However, as the truck "T" moves rearwardly in a direction toward loading dock surface "S", lines 22a appear to slide over line 26a with the point of intersection of the two lines precisely indicating the distance to the loading dock. A dock worker by looking at the image appearing on the rear surface of the truck can accurately gauge the distance between the truck and the loading dock.

Figure 11:
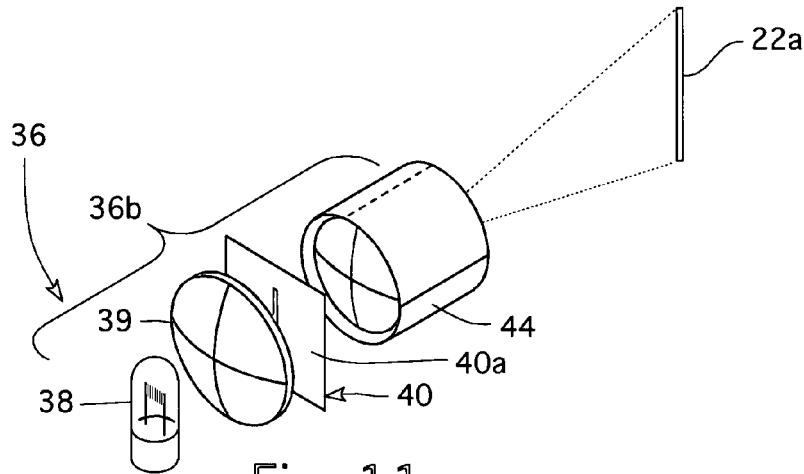
FIG. 11 is a generally perspective, illustrative view of a second projector for projecting a second image onto a remotely positioned object.
Figure 14:
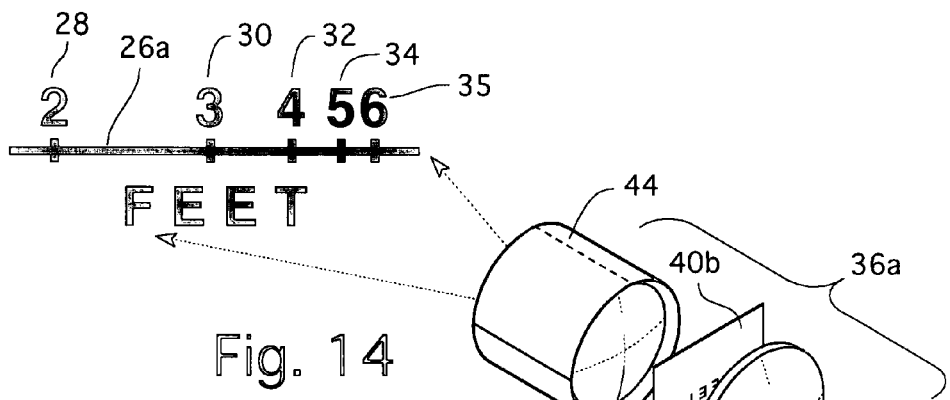
FIG. 14 is a generally perspective, illustrative view of a first projector projecting a first image onto a remotely positioned object.

Projectors suitable for the use in connection with this latest described embodiment of the invention can comprise the earlier described projector units, such as unit 36 which is the of the character illustrated in FIGS. 11 and 14 of the drawings.

Figure 19:
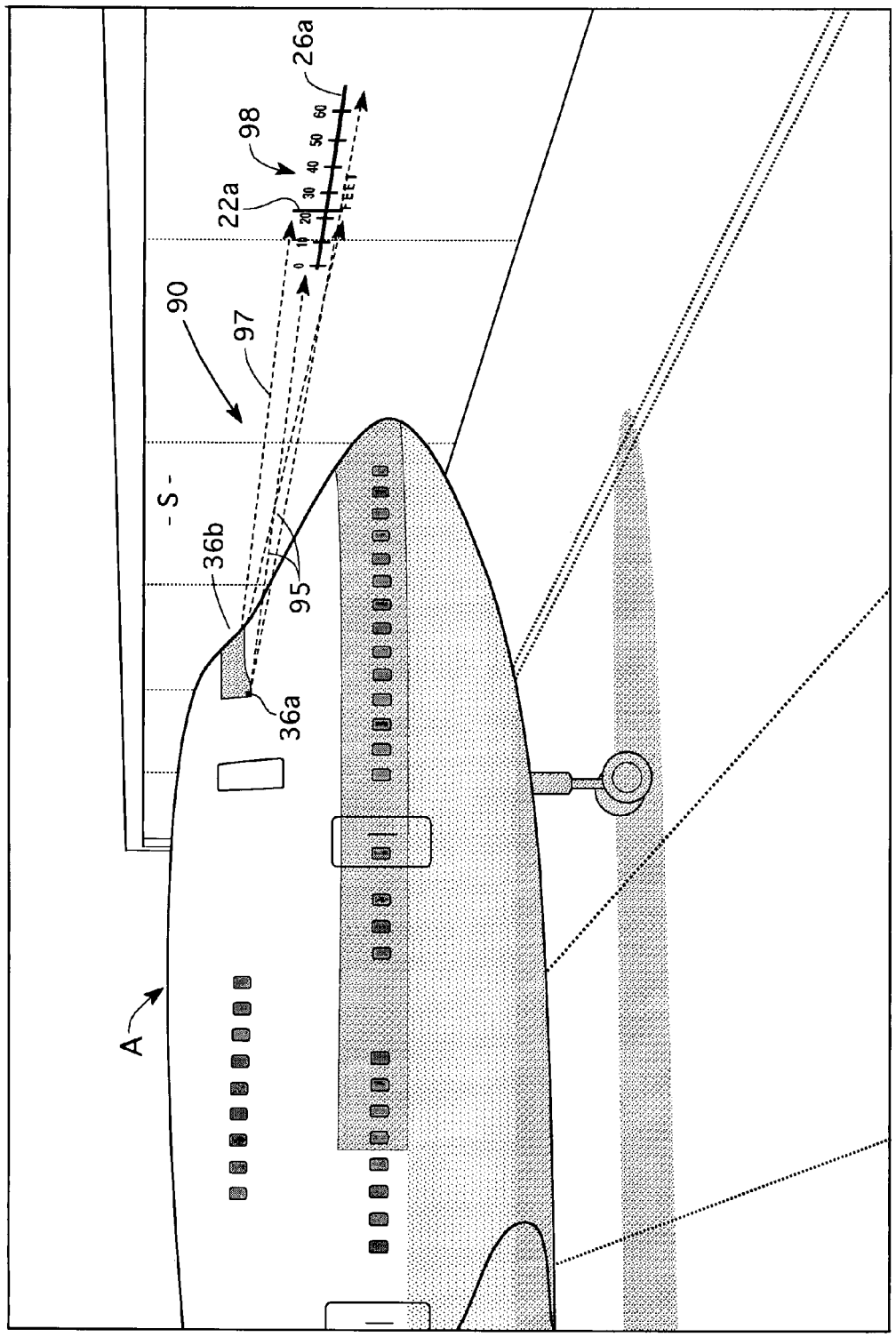
FIG. 19 is a generally perspective, illustrative view further illustrating the use of the present invention with an airplane.

Turning next to FIG. 19 of the drawings, yet another form of the apparatus of the invention is there illustrated and generally designated by the numeral 90. The apparatus of this alternate form of the invention is somewhat similar to that discussed in connection with the earlier described embodiments of the invention and like numerals are used to identify like components. However, as depicted in FIG. 19, the projectors are here mounted on an aircraft "A". The projector units, which are generally designated by numerals 36a and 36b are here mounted proximate the aircraft cabin and are constructed and arranged to project selected images onto a remote surface "S" such as a wall or a hangar door. As in the earlier described embodiments of the invention, projector units 36a and 36b produce images of the character shown in FIGS. 4 and 5.

More particularly, first projector unit 36a projects along first path 95 an image 26, such is the image shown in FIG. 5. Similarly, second projector unit 36b projects along second path 97 an image 22, such as the image shown in FIG. 4. As before, first and second paths 95 and 97 cross so as to produce image 98 illustrated in FIG. 19.

As before when the aircraft moves toward surface "S" line 22a appears to slide over line 26a with the point of intersection of the two lines precisely indicating the distance to surface "S". The pilot can accurately gauge distance between the aircraft and surface "S" by looking at the image appearing on surface "S".

Projectors suitable for use in connection with the latest described embodiment of the invention can comprise the earlier described projector units, such as unit 36 which is the of the character illustrated in FIGS. 11 and 14 of the drawings.

Turning finally to FIG. 20, another form of the apparatus of the invention is there illustrated and generally designated by numeral 100. The apparatus of this alternate form of the invention is somewhat similar to that previously described, but the apparatus is here specially designed as an aftermarket parking apparatus.

The apparatus of this latest form of the invention comprises an elongated, generally rectangularly shaped housing 102 to which a connecting bracket 104 is connected. Bracket 104 is provided with a plurality of apertures 105 that can be used to attach the apparatus to the rear of a vehicle such as a truck or automobile. Projector units, such as the earlier described projector units 36a and 36b, are here mounted within housing 102 proximate ends 102a and 102b thereof and are constructed and arranged to project selected images, such is the images depicted in FIGS. 4 through 7, onto a remote surface, such as the surface of a wall, or garage door.

As indicated in FIG. 20, a video camera 20 of the character previously described is mounted within housing 102 intermediate its ends. Connected to camera 20 and extending from housing 102 are electrical conduits 108, which conduits can be used in a manner well understood by those skilled in the art to interconnect the camera with the source of power and with an appropriate viewing screen disposed within the vehicle. Similarly, extending from housing 102 are electrical conduits 110 that can be used to interconnect the projector units with the source power and with the vehicle backup lights circuitry.

While the invention has been described herein with reference to certain preferred embodiments, those embodiments have been presented by way of example only, and not to limit the scope of the invention. Additional embodiments thereof will be obvious to those skilled in the art having the benefit of this detailed description. For example, as already noted, there may be times when the desired distance measured from a back of a vehicle may vary. In such a situation, it might be desirable to include multiple devices according to the present invention, or allow for the scale image to be varied so as to accommodate variations in conditions and/or needs. Further modifications are also possible in alternative embodiments without departing from the inventive concept.

Accordingly, it will be apparent to those skilled in the art that still further changes and modifications in the actual concepts described herein can readily be made without departing from the spirit and scope of the disclosed inventions as defined by the following claims.

What is claimed is:

1. A distance indicating apparatus for determining the distance between a fixed object and a moving object, comprising:
    first and second spaced-apart projectors mounted on a selected one of the fixed object and the moving object for projecting first and second images onto a projection target surface of the selected one of the fixed object and the moving object, said first projector projecting said first image along a first path and said second projector projecting said second image along a second path, said first and second images creating a visual distance indication when the fixed object and the moving object are within a preselected distance from each other by projecting both the first and second images upon the projection target area in which both are visible,
    wherein one of the first and second images provides a distance indicating scale and the other of the first and second images provides an index for the distance indicating scale that moves relative to the distance indicating scale on the projection target area as the distance between the fixed object and the moving object varies and is less than the preselected distance.

2. The apparatus as defined in claim 1 in which the distance indicating scale includes non-linear markings indicative of distance.

3. The apparatus as defined in claim 1 in which said first and second spaced-apart projectors are mounted on the moving object and in which the apparatus further includes a rearview camera mounted on the moving object for viewing the fixed object.

4. The apparatus as defined in claim 1 in which one of said first and second spaced-apart projector means comprises a light source, a film image and a lens disposed intermediate said light source and said film image.

5. The apparatus as defined in claim 1 and which one of said first and second spaced-apart projectors comprises a laser and a holographic film recorded with an image.

6. The apparatus as defined in claim 1 in which one of said first and second spaced-apart projectors comprises a light source and a generally cylindrically shaped lens.

7. The apparatus as defined in claim 1 in which the first and second spaced-apart projectors are mounted on the fixed object.

8. The apparatus as defined in claim 7 in which the fixed object comprises a loading dock.

9. The apparatus as defined in claim 8 in which the moving object comprises a motor vehicle in which a driver of the motor vehicle has a blocked rear view vision such that the driver seated within the motor vehicle does not have a direct line of sight behind the motor vehicle except by one or more side rear view mirrors.

10. The apparatus as defined in claim 9, further comprising:
    a mirror mounted in a fixed location relative to the fixed object for allowing the driver to view the projection target area.

11. The apparatus as defined in claim 1 in which the first and second spaced-apart projectors are mounted on the moving object.

12. The apparatus as defined in claim 1 in which the moving object comprises a motor vehicle.

13. The apparatus as defined in claim 1 in which the moving object comprises an airplane.

14. The apparatus as defined in claim 1 in which the moving object comprises a water-going vessel.

15. A method for indicating a variable distance between a fixed object and a moving object when the fixed and moving objects are within a preselected distance of each other, comprising:
    projecting a distance indicating scale and a distance identifier onto a projection target surface of a selected one of the fixed object and the moving object when said fixed object and said moving object are within the preselected distance of each other, wherein the distance indicating scale is projected along a first path and the distance identifier is projected along a second path, the distance indicating scale and the distance identifier creating a variable visual distance indication on the projection target surface when distance between the fixed object and the moving object changes varies and is less than the preselected distance.

16. The method as defined in claim 15 in which the distance indicating scale includes non-linear markings indicative of distance.

17. The method as defined in claim 15 comprising the additional step of varying the distance indicating scale between a first and a second scale.

18. The apparatus as defined in claim 15 in which the fixed object comprises a loading dock and the moving object comprises a motor vehicle in which a driver of the motor vehicle has a blocked rear view vision such that the driver seated within the motor vehicle does not have a direct line of sight behind the motor vehicle except by one or more side rear view mirrors.

19. The apparatus as defined in claim 18, further comprising:

allowing the driver to view the projection target area through use of a mirror mounted in a fixed location relative to the fixed object.

20. The apparatus as defined in claim 15 in which the moving object comprises an airplane.

* * * * *